United States Patent
Tanaka

[11] Patent Number: 5,913,939
[45] Date of Patent: Jun. 22, 1999

[54] FACE GEAR HAVING A NOTCHED POSITIONING GROOVE ON THE CIRCUMFERENCE

[75] Inventor: Jiro Tanaka, Okayama, Japan

[73] Assignee: Sumitomo Electric Industries, Ltd., Osaka, Japan

[21] Appl. No.: 08/865,834

[22] Filed: May 30, 1997

[30] Foreign Application Priority Data

Jun. 14, 1996 [JP] Japan .................................. 8-175695

[51] Int. Cl.$^6$ .............................. F16H 55/17; F16H 1/08; F16H 1/14
[52] U.S. Cl. ................................................ 74/434; 74/460
[58] Field of Search ........................ 29/559, 893; 74/431, 74/434, 459.5, 460

[56] References Cited

U.S. PATENT DOCUMENTS

| | | | |
|---|---|---|---|
| 4,715,243 | 12/1987 | Morishita et al. | 74/434 |
| 4,886,831 | 12/1989 | Lanzerath et al. | 29/893 |
| 5,203,223 | 4/1993 | Himmeroeder | 74/460 X |

FOREIGN PATENT DOCUMENTS 816052  7/1937  France ..................................... 29/893

OTHER PUBLICATIONS

Patent Abstracts of Japan, vol. 012, No. 343 (M–741), Sep. 14, 1988.
Patent Abstracts of Japan, vol. 012, No. 454 (M–769), Nov. 29, 1988.
Patent Abstracts of Japan, vol. 012, No. 208 (M–709), Jun. 15, 1988.
Patent Abstracts of Japan, vol. 009, No. 249 (M–419), Oct. 5, 1985.

*Primary Examiner*—Khoi Q. Ta
*Attorney, Agent, or Firm*—Sughrue, Mion, Zinn, Macpeak & Seas, PLLC

[57] ABSTRACT

A bevel gear in which the sizing can be easily effected without degrading the quality of the gear. In a sintered or forged gear having a toothed portion (1) formed on an axial end face thereof, a notched groove (4) is formed in and across an outer circumferential surface of the gear in an axial direction. The construction of the notched groove (4) is specified so that its quality is kept.

11 Claims, 2 Drawing Sheets

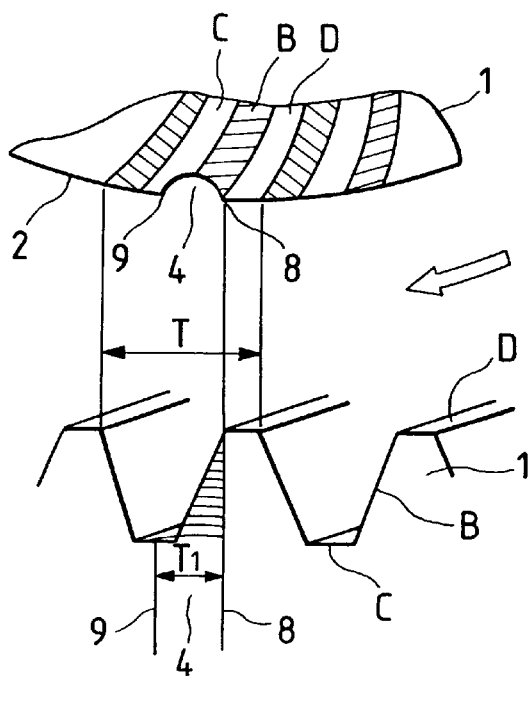
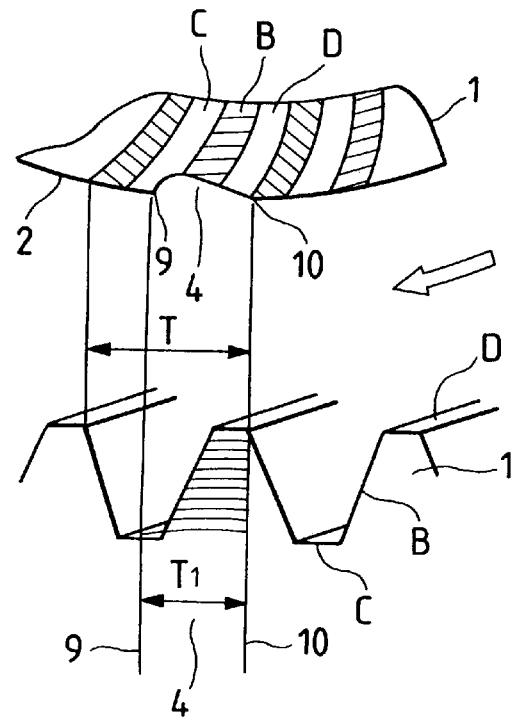
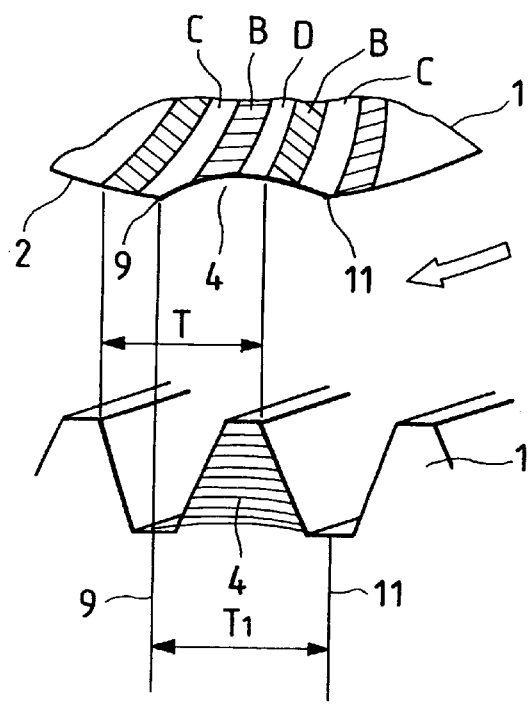

FACE GEAR HAVING A NOTCHED POSITIONING GROOVE ON THE CIRCUMFERENCE

BACKGROUND OF THE INVENTION

This invention relates to a gear, such as a spiral bevel gear, formed with a toothed portion on its axial end face by sintering or forging.

In general, a medium- or small-size gear of this type is produced by a method in which powder of metal, such as iron, is pressed by a mold, and is sintered, and then the sintered product is again compressed by a die so as to correct its dimensions (This is called sizing). Similarly, a gear, formed by forging, is finished by sizing.

The sizing is effected by a method in which the sintered or forged workpiece is inserted into a lower punch of the die, and is pressed by an upper punch. When inserting the workpiece, the workpiece needs to be positioned so that a toothed portion formed on an axial end face of the workpiece mates with a toothed portion of the lower punch.

This positioning operation requires attention, and suffers from problems in that a die accident due to the improper positioning may occur, and that a dent may be formed in the toothed portion of the workpiece by a collision. Further, the required attention lowers the efficiency of the production, and hinders automation.

SUMMARY OF THE INVENTION

The present invention seeks to overcome the above problems, and a feature of the invention is that a notched groove is formed in an outer circumferential surface of a gear in an axial direction.

Thanks to the provision of this notched groove, the mechanical, workpiece positioning operation during the insertion of the workpiece in sizing can be made quite easily and positively by the use of, for instance, a projection provided on a die so as to correspond to the notched groove.

If the width $T_1$ of the notched groove in the direction of the outer circumference, its position, its angle in the axial direction, and its length are specified as follows, then it is possible to prevent a reduced strength, premature wear and chipping of the workpiece and the work forming die due to the provision of the notched groove, and the smooth positioning can be effected.

In one embodiment, the width $T_1$ of the notched groove in the direction of the outer circumference is equal to or smaller than the pitch T of the teeth. In this case, preferably, the notched groove is formed over an area which excludes a tooth crest, and includes an inclined surface and a tooth bottom (bottom land) continuous therewith, or is formed over an area which includes the tooth crest, the inclined surface continuous therewith, and the tooth bottom.

In another embodiment, the width of the notched groove in the direction of the outer circumference is larger than the pitch of the teeth. In this case, preferably, the notched groove is formed over an area which extends between predetermined points of two adjacent tooth bottoms between which two inclined surface and a tooth crest, disposed therebetween, exist.

In view of the operation and the mechanical strength of the gear, the depth of the notched groove should preferably be made as small as possible in such a range as not to adversely affect the positioning function. This depth is in the range of 0.5 to 3 mm although it depends on the specification of the gear.

With respect to the shape, a curved shape or a semi-circular shape is preferred as described in embodiment described below, but any other suitable shape such as a V-shape may be adopted.

In view of the mechanical positioning, preferably, the notched groove extends accurately parallel to the axis, and is formed completely across the outer circumferential surface of the gear in the axial direction.

In the embodiments, although the diametrically-opposed, two notched grooves are formed, the number thereof may be one or more than two if necessary. The gear of this construction is best suited for a bevel gear and particularly a spiral bevel gear requiring much time and attention for positioning.

BRIEF DESCRIPTION OF THE DRAWINGS

In the accompanying drawings:

FIGS. 2(a) and 2(b) are views similar to FIG. 1(c), but showing other embodiments in which only the construction of notched grooves are varied; and FIG. 3 is a view similar to FIG. 1(c), but showing a further embodiment in which the construction of notched grooves is varied.

DETAILED DESCRIPTION OF THE PREFERRED EMBODIMENTS

A preferred embodiment of the invention will now be described.

Figure 1A:
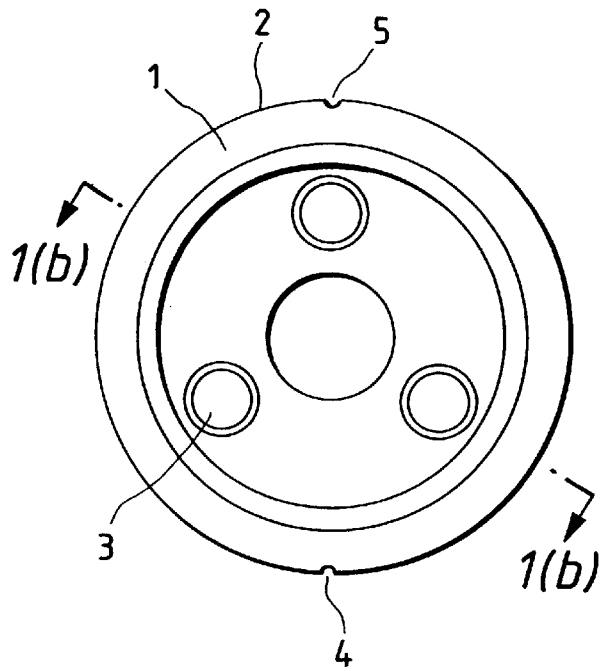
FIG. 1(a) is a front-elevational view showing a preferred embodiment of a spiral bevel gear of the invention.
Figure 1B:
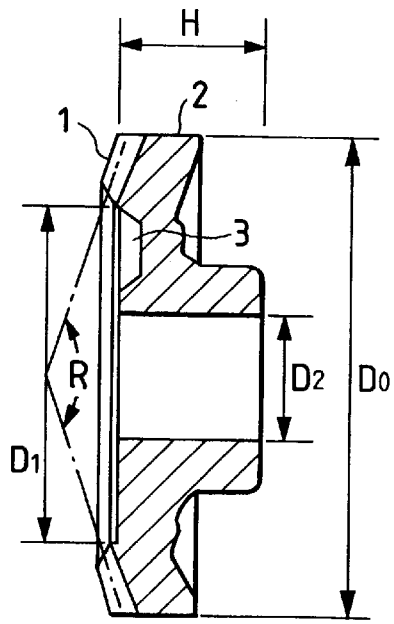
FIG. 1(b) is a cross-sectional view taken along the line 1(b)—1(b) of FIG. 1(a)
Figure 1C:
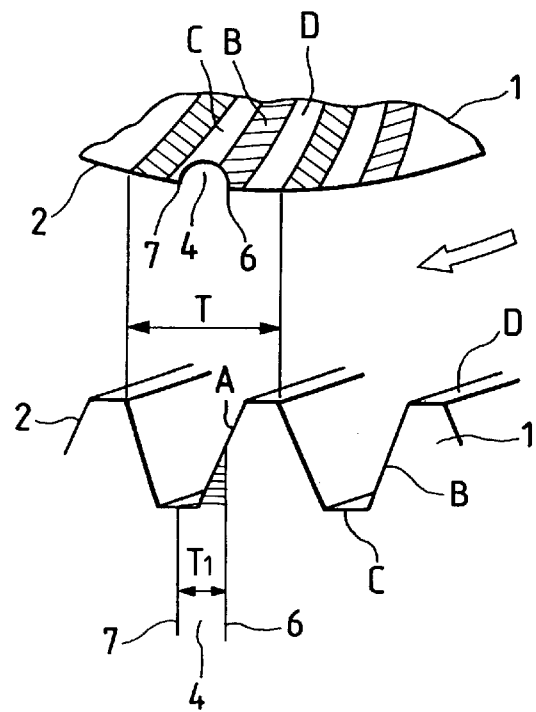
FIG. 1(c) is a schematic view of a toothed portion as seen from an upper side and an obliquely-upper side, showing the construction of a notched groove.

FIG. 1 shows a spiral bevel gear made of sintered iron according to one embodiment of the invention, and FIG. 1(a) is a front-elevational view thereof, FIG. 1(b) is a cross-sectional view taken along the line 1(b)—1(b) of FIG. 1(a), and FIG. 1(c) is a schematic view of a toothed portion 1 as seen from an upper side and an obliquely-upper side, showing the construction of a notched groove 4. An outer diameter $D_0$ of the gear is 46.5 mm, an inner diameter $D_1$ of the gear is 33 mm, a diameter $D_2$ of a shaft hole is 12 mm, a conical angle R is 145°, the number of teeth of the spiral gear is 36, the pitch T of the teeth is 4 mm, and an axial height H of the gear is 13.3 mm. The gear configuration is Gleason, the module is 1.25, a pressure angle is 20°, a shaft angle is 90°, a helix angle is 35°, and the helix direction is right. The hardness of the sintered iron is not less than HRA 60, and its density is not less than 6.9 g/cm$^3$.

In the drawings, reference numeral 2 denotes an outer circumferential surface, and a plurality of reinforcement recesses 3 are provided, but may be omitted. Notched grooves 4 and 5 are formed in and across the outer circumferential surface 2 and in diametrically opposite relation to each other, and extend parallel to the axis of the gear.

When the gear is viewed from its axial end, each of the notched grooves 4 and 5 has a semi-circular shape having a radius of 1.5 mm, and extends from a midway 6 of an inclined surface B of the spiral gear to a point 7 near to a rear end of a tooth bottom C continuous with this inclined surface B, and each of the notched grooves are formed in and across the outer circumferential surface and in parallel relation to the axis of the gear.

In this notched groove construction, that portion of a workpiece forming die, corresponding to the portion 6 of the inclined surface B at the outer circumference, forms a sharp edge, and besides the remaining portion of the tooth bottom C adjacent to the point 7 is narrow. Thus, these portions are liable to chipping. On the part of the workpiece, the portion 6 forms a sharp edge, and the density is liable to be low in the vicinity of a tooth crest D, and therefore chipping is liable to occur at this portion by contact. FIGS. 2(a) and 2(b) are views similar to FIG. 1(c), but respectively show other embodiments in which only the positions of notched grooves and their configuration are varied. In FIG. 2(a), the notched groove 4 has a semi-circular shape having a radius of 2 mm, and extends from an upper end 8 of an inclined surface B, disposed contiguous to a tooth crest D, to a central portion 9 of a tooth bottom C. With this construction, a sharp edge is not formed on the inclined surface B at the outer circumference, and the remaining portion of the tooth bottom C adjacent to the portion 9 is increased.

The construction of FIG. 2(b) is an improvement over the construction of FIG. 2(a), and the notched groove 4 has a curved shape, and extends from one end 10 of a tooth crest D, and further extends generally linearly over an inclined surface B continuous with the tooth crest D, with the depth gradually increased, and further extends generally arcuately to a central portion 9 of a tooth bottom C.

With this construction, the smooth positioning can be effected, and the chipping of the die and the workpiece is further suppressed.

FIG. 3 is a view similar to FIG. 1(c), but shows a further embodiment in which only the width of notched grooves and their configuration are varied. The notched groove 4 shown in FIG. 3 is an example in which its width $T_1$ in a direction of the outer circumference is larger than the pitch T of the teeth. The notched groove 4 is defined by a curved surface which extends from a midway 11 of a tooth bottom C through an inclined surface B continuous therewith, a tooth crest D and an inclined surface B to a central portion 9 of a tooth bottom.

With this construction, the positioning can be effected smoothly, and the chipping of the punch and the workpiece due to the presence of a sharp edge is prevented. However, when the gear is in mesh with a mating pinion, and is rotated in a direction of an arrow, there is a fear that the surfaces of the teeth are subjected to premature wear since the area of meshing is reduced because of the provision of the notched grooves.

Therefore, in the embodiment, although the depth of the deepest portion of the notched groove is 2.5 mm, its depth should preferably be reduced in such a range as not to adversely affect the positioning function, and also its width should preferably be reduced in such a range as not to produce a sharp edge. Incidentally, in view of the sintering by pressing and also of the sizing mechanism, it is extremely difficult to form the notched groove for positioning purposes in the shaft hole as in a key groove.

The gear of the present invention can be easily and positively positioned in the sizing operation, and can be easily produced, and the production cost can be reduced.

The quality of the gear can be kept equal to or better than the quality of the conventional gears.

What is claimed is:

1. A die-molded gear having a toothed portion on an axial end face, wherein at least one notched groove is formed in an outer circumferential surface of said gear so as to extend in an axial direction.

2. A gear according to claim 1, wherein a width of said notched groove in a circumferential direction is equal to or smaller than a pitch of teeth of said gear.

3. A gear according to claim 2, wherein said notched groove, as viewed in the axial direction, extends between an inclined surface and a tooth bottom contiguous with said inclined surface.

4. A gear according to claim 2, wherein said notched groove, as viewed in said axial direction, extends between a tooth crest and a tooth bottom through an inclined surface interposed between said tooth crest and said tooth bottom.

5. A gear according to claim 1, wherein a width of said notched groove in a circumferential direction is larger than a pitch of teeth of said gear.

6. A gear according to claim 5, wherein said notched groove, as viewed in said axial direction, extends from a first tooth bottom through a first inclined surface contiguous with said first tooth bottom, a tooth crest contiguous with said first inclined surface, and a second inclined surface contiguous with said tooth crest to a second tooth bottom contiguous with said second inclined surface.

7. A gear according to claim 1, wherein said notched groove extends across said outer circumferential surface of said gear and in parallel to said axial direction.

8. A gear according to claim 1, wherein said toothed portion is in the form of a bevel gear or a spiral bevel gear.

9. A gear according to claim 1, wherein said gear forms a part of gear pair with intersecting axes.

10. A gear having a toothed portion on an axial end face, wherein at least one notched, positioning groove is formed in an outer circumferential surface of said gear and is operative to mate with a projection provided on a die.

11. A gear having a toothed portion on an axial end face, with means, formed in an outer circumference of said gear, for mating with a projection provided on a die.

* * * * *